United States Patent [19]

Harrison

[11] Patent Number: 4,666,318

[45] Date of Patent: May 19, 1987

[54] SELF-LUBRICATING BEARINGS

[75] Inventor: Michael B. Harrison, Bristol, England

[73] Assignee: Ampep, plc, Bristol, England

[21] Appl. No.: 767,750

[22] Filed: Aug. 21, 1985

[30] Foreign Application Priority Data

Jan. 30, 1985 [GB] United Kingdom ............... 8502295

[51] Int. Cl.$^4$ .............................................. F16C 33/04
[52] U.S. Cl. .................................... 384/625; 384/300; 384/907.1; 384/912; 384/913
[58] Field of Search .......... 308/241, DIG. 8, DIG. 9, 308/DIG. 7; 384/908, 907, 300, 298, 625, 907.1, 912, 913

[56] References Cited

U.S. PATENT DOCUMENTS

| | | | |
|---|---|---|---|
| 3,864,197 | 2/1975 | Shobert | 384/300 |
| 4,005,914 | 2/1977 | Newman | 308/241 |
| 4,277,108 | 7/1981 | Wallace | 308/241 |
| 4,335,924 | 6/1982 | McCloskey | 308/241 |

Primary Examiner—Lenard A. Footland
Attorney, Agent, or Firm—Pravel, Gambrell, Hewitt & Kimball

[57] ABSTRACT

A bearing, such as a plain spherical self-aligning bearing, has a reinforced low-friction woven plastics element (for example comprising ptfe) which is in sliding contact with a very hard, very smooth counterface. The bearing exhibits reduced wear when subjected to low-stress, small-amplitude motions.

17 Claims, 2 Drawing Figures

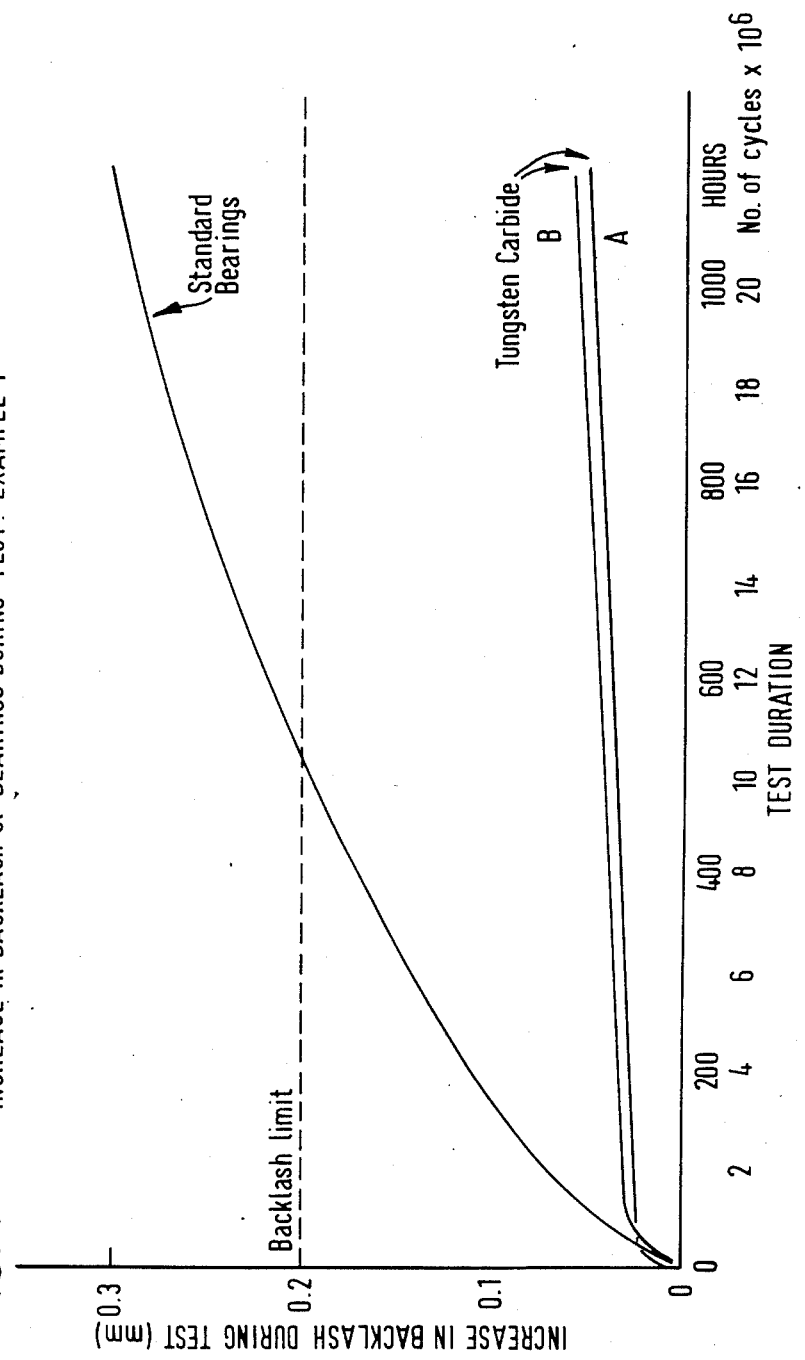

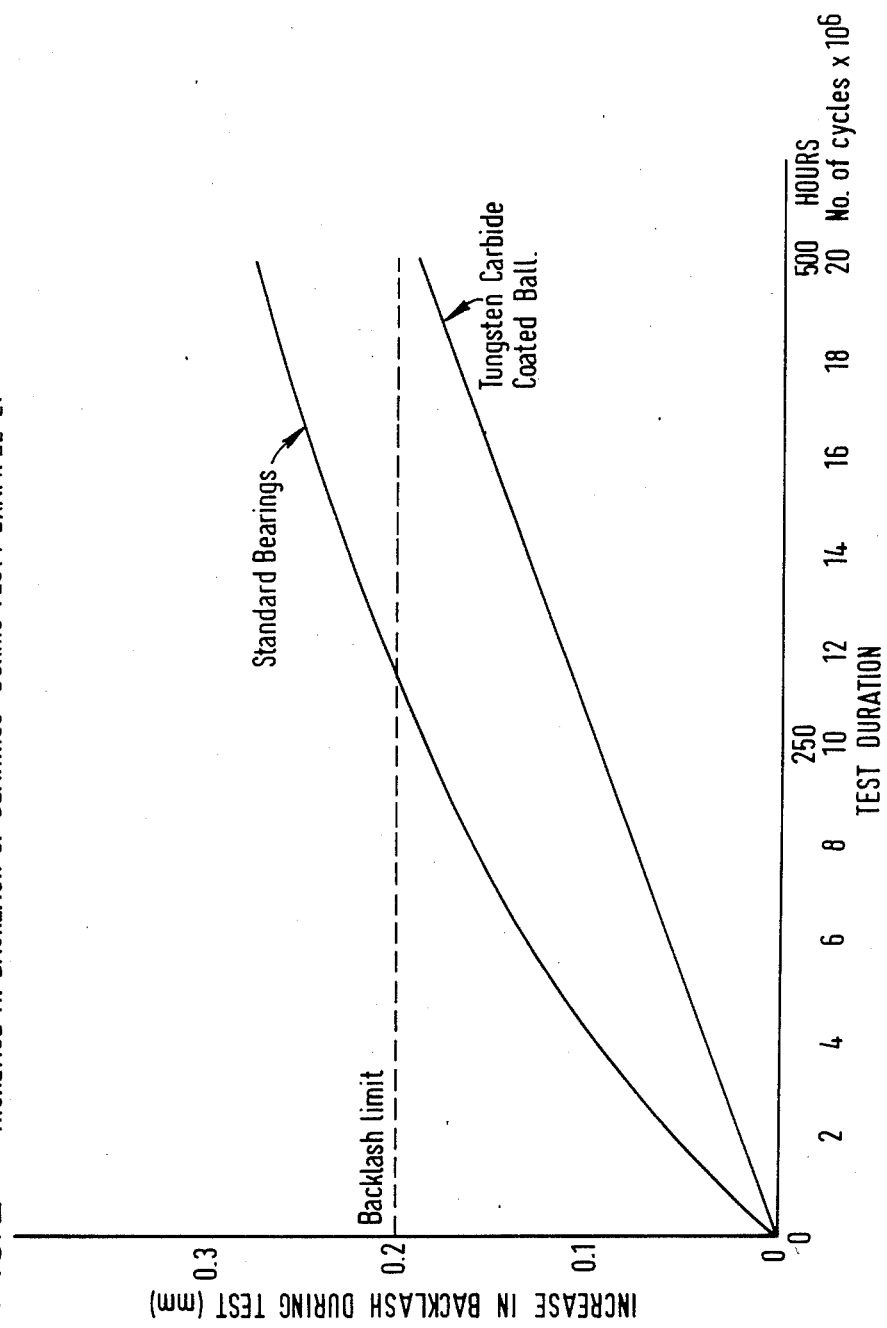

SELF-LUBRICATING BEARINGS

FIELD OF THE INVENTION

This invention relates to self-lubricating bearings which utilize low-friction plastics materials particularly, although not exclusively, polytetrafluorethylene (pfte) for the self-lubricating sliding surface.

BACKGROUND OF THE INVENTION

Bearings using ptfe as the low friction self lubricating sliding surface have been in regular use in the aerospace industry for 25 years. When such bearings are used in airframes and flying controls, a special construction of the ptfe is required, in order to overcome the inherent cold flow tendencies of the bulk polymer at the high stress levels specified by aerospace designers. For this purpose thin films of woven ptfe bearing surfaces are frequently reinforced with sintered bronze and textile yarns such as glass, graphite fibres, or high strength organic yarns of relatively high melting point (i.e. higher than 250° C.). Woven structures are usually suffused with resin systems such as phenol formaldehyde, epoxies or cyanoacrylates to bind the sliding surface into a dense structure. This resin system can also double as an adhesive system for securing the ptfe layer to a substrate so as to produce a mechanical component for easy installation of the complete bearing into the aircraft structure. Spherical plain self aligning bearings, or cylindrical journal bearings with or without flanges often incorporate ptfe in this form, using hardened steel counterfaces. International standards are widely employed to rationalize the size ranges commercially available off-the-shelf in both inch and metric sizes but planar and more complex shapes are also available as nonstandard items.

This type of bearing is now widely employed and known to be extremely successful in many military and civil fixed wing and variable geometry aircraft where its high load carrying capacity, freedom from maintenance and resistance to fretting damage are important. Its use has also extended to ground based application in fighting vehicles, public and commercial transports, oil and gas pipelines, off-road equipment, marine applications and racing cars.

However, in applications where low stress, high frequency, small amplitude motions occur, as in helicopter rotating assemblies and vehicle suspension systems, the ptfe bearing has so far exhibited a lack of endurance, having a useful life of the order of 5-10 times less than predicted. For example, the track rods and pitch links operating the pitch of helicopter main and tail rotor blades at each revolution of their respective rotors, typically achieve lives of 500-1000 flying hours for main rotors, and 300-600 hours for tail rotors in general terms, after which the ptfe bearings need to be replaced because of unacceptable backlash. In military uses, where 300 hours per annum peacetime operation are averaged, these lives may be acceptable, but such performances are unacceptable to the civil helicopter operator where 1000 hours per annum is the norm. In the latter case, guarantees of 2000 hours plus between replacements and overhaul are required, a bearing performance requirement which has consistently eluded the self-lubricating ptfe bearing manufacturers for the past 10 years or more.

The ptfe liner of a textile type bearing comprises high molecular weight ptfe in long chains making up the individual filaments in each bundle of ptfe multi-filament yarns. The woven textile produced from these yarns is further suffused with resin and possibly other textile fibres and/or fillers such that from 30% to almost 100% of the sliding surface of the resulting liner may be constituted by the ptfe, depending on the particular construction employed, the remainder of the contact surface being constituted by the resin and fillers. The ratio of ptfe to resin at the sliding surface controls the wear resistance of the liner with maximum wear resistance at high stresses and slow oscillations being obtained with a low ratio of ptfe to resin and other constituents.

In the early stages of the life of the bearing, the high molecular weight ptfe undergoes chain scission by the high mechanical forces and thermal degradation at the sliding interface to produce a low molecular weight transfer film or third body, in tribological terms, at the sliding interface. It is this third body which acts as a "grease" in shear which produces the characteristic properties of ptfe sliding bearings and thus its initial formation and its subsequent maintenance are of vital importance to the effectiveness and long life of the bearing. It was recognized 20 years ago that the counterface must be smooth to prevent ploughing and disruption of the third body film so as to preserve a stable system for as long as possible and to prevent ejection of the third body from the ends of the bearings if a low wear rate was to be achieved. Thus hard steel corrosion resistant counterfaces were adopted capable of being finished to approximately 4 micro inches (0.10 microns) centerline average (CLA) with hardness values of around 700 VPN to enable the required surface finish to be obtained more readily.

At high stress levels of the order of 25,000-34,000 lbf/sq. inch (172-234 MPa) at slow oscillating speeds and steady loads such bearings demonstrate excellent wear resistance in accordance with the American and European International Technical standards currently in force, but, as mentioned previously, such bearings are much less satisfactory at low stress levels.

The present invention is based on the surprising discovery, by simulation of the helicopter operating conditions on a test rig, that the wear mechanism at high frequency, light reversing loads with small amplitude oscillations is due initially to roughening and wear of the hard steel counterfaces, which in turn induces a much higher wear rate of the ptfe liner system. Further, the present invention stems from the realization that under the lightly loaded reversing applications typical of helicopter flying controls and transport vehicle suspension systems, the vital third body fails to form rapidly because there is a general lack of adequate thermal and mechanical forces to promote degradation. As a consequence the resin and fillers in the liner severely abrade the surface of the hardened steel ball, despite their relative softness, causing severe damage which in turn ploughs into the ptfe liner causing an excessive and unexpected rate of wear.

SUMMARY OF THE PRESENT INVENTION

According to the present invention there is provided a bearing comprising a reinforced low-friction plastics element having a sliding surface in sliding contact with a counterface having a surface roughness which is not greater than 0.050 microns CLA and a hardness of not less than 1000 VPN.

In the context of this specification, low stress levels are stress levels of less than 5000 lbs/sq.in. (35 MPa) in fluctuating or alternating load conditions. By small amplitudes, in terms of angular oscillatory motions, we mean amplitudes up to a maximum of ±12° rotation. The frequency of load cycling and oscillating motion with which the present invention is concerned are generally as encountered in helicopter flying control and rotor systems and also in ground transport suspension systems, which may be as low as, or even lower than 10 cpm at steady loads.

Thus a bearing in accordance with the present invention has a counterface of extreme hardness and smoothness which will resist resin and filler damage from the ptfe sliding surface until a stable third body or transfer film of low molecular weight ptfe has been established at the sliding interface.

BRIEF DESCRIPTION OF THE DRAWINGS

FIGS. 1 and 2 are graphs of total backlash plotted against test duration.

DETAILED DESCRIPTION OF THE PREFERRED EMBODIMENT

In the present invention, very hard refractory materials are preferred for the counterface. Pure metals, metal alloys and metallic coatings are likely to be unsuitable owing to their relatively low hardness and their inherent tendency to flow plastically at the sliding contact points on the bearing surfaces. Preferably the hardness of the counterface is not less than 1100 VPN.

The plastics element may be of a type well known to those skilled in the art and, for example, may be constituted as described in U.S. Pat. Nos. 2,906,552 and Re. 24,765 (Reissue of U.S. Pat. No. 2,804,886).

The counterface may comprise the surface of a solid or coated body where the solid material or the coating comprises refractory or ceramic materials or a substantial proportion of these materials embedded in a metal matrix. The refractory solids or particles are preferably the carbides, nitrides, borides or oxides of silicon, tungsten, titanium, chromium or aluminium, although materials such as synthetic sapphire and diamond may be used. For example, the counterface may comprise tungsten carbide in a cobalt matrix silicon carbide, silicon nitride with a yttrium/aluminium oxide/nitrogen vitreous matrix (sialon), chromium oxide or aluminium oxide.

The solid components are preferably produced from solid powder compacts subsequently sintered at high temperatures to obtain low porosity. Where the counterface comprises a coating, for example on a metal substrate, the coating is preferably applied by Linde detonation gun technique or plasma arc spraying to obtain maximum adhesion to the metal. The coating thickness after final machining is preferably not less than 0.002" (0.05 mm) (for example 0.005" (0.125 mm)) thick which means that chemical or physical vapor methods of deposition and ion plating are unlikely to be suitable since they are capable of producing effective coating thicknesses of the order only of 0.0004" (0.010 mm). The substrate metal for the coated components is preferably through-hardened corrosion resistant steel with a hardness of 700 VPN but this does not preclude the use of softer steels, high strength titanium or aluminium alloys where considered appropriate.

The surface roughness referred to herein is the roughness as measured with a suitable instrument such as produced by Rank Tayler Hobson. The required standard of finish is an optical rather than an engineering standard. Preferably, the surface roughness is not greater than 0.025 microns CLA. Such surfaces can only be achieved by specially developed techniques, for example diamond grinding, honing and polishing. The coatings or solid materials must be of sufficiently low porosity to allow this standard of finish to be maintained, those of relatively high porosity typically yielding surface finishes of 0.4 to 0.8 micro inches (0.01 to 0.02 microns) CLA and of less than 0.4 micro inches (0.01 microns) CLA for those with low porosity. This virtually yields mirror finishes completely devoid of visual imperfections to the naked eye.

As previously stated the final bearing assemblies usually take the form of plain spherical or journal bearings. In the former case, the bearing surface and counterface are manufactured as an inseparable assembly, whereas in the latter a separate or detachable mating part to the standard described herein would be provided to achieve the required performance.

EXAMPLE 1

A test was conducted, on a test rig, of the following bearings:

(a) Bearings (A) in accordance with the present invention having a solid tungsten carbide ball as the counterface;

(b) Bearings (B) in accordance with the present invention having a counterface constituted by a tungsten carbide coating, (c) Standard bearings, in accordance with the technical requirements of existing American and European standards, with a counterface constituted by a through hardened steel ball, but otherwise identical to bearings A and B.

The characteristics of the test were as follows:
Bearing peak stress: ±1000 lbf/sq.inch
Loading: Sinusoidal
Oscillating angles:
  35 11° rotation
  ±5° misalignment
Phasing: Maximum loads coinciding with maximum angular displacement.
Frequency: 6 Hz
Endurance life requirement: 1000 hours ($20 \times 10^6$ cycles)

It can be seen from FIG. 1 that the backlash limit for the standard bearings to current international standards was achieved after some 500–600 hours ($11 \times 10^6$ cycles) of operation while the bearings in accordance with the present invention yielded performances with much slower increases in backlash. Extrapolation of these wear curves indicates a final duration of some 5–10 times that of the standard steel ball components. Examination of the counterfaces following these tests indicated a much higher level of damage occurring to the steel counterfaces with 0.0004/0008" (0.01/0.02M of steel) actually being worn away during the test program. No material loss could be measured on the solid or coated tungsten carbide components. Furthermore, the ptfe bearing surfaces used in conjunction with the standard steel balls were in an advanced state of wear whereas those of the improved versions were polished, but otherwise appeared to be virtually unworn.

EXAMPLE II

A test as in Example I was repeated on identical beatings but with the stress level and frequency doubled. In effect this quadrupled the energy input at the sliding interfaces. as indicated in FIG. 2, the standard hardened steel balls performed similarly to the test in Example I, taking approximately 250 hours ($11 \times 10^6$ cycles) to achieve the maximum permitted backlash. The tungsten carbide coated specimens took approximately 500 hours ($21 \times 10^6$ cycles) to reach the limiting value, thereby supporting the theory that the greater energy input causes the third body to form more rapidly with the result that the normal ptfe wear processes are now in ascendency, i.e. the beneficial effects of the very hard surfaces are attenuating. The steel ball surfaces still exhibited some damage due to the test but in contrast to Example I, no measurable wear of the steel was detected. The surface of the tungsten carbide coated ball was in a condition similar to its counterparts from Example I tests.

The ptfe liners also exhibited wear scars but were obviously deeper in the case of the bearings containing the standard hard steel balls. The hard coated balls exhibited only twice the life of the standard steel balls under these arduous conditions.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limited sense.

I claim:

1. A bearing comprising:
   a reinforced low-friction plastics element comprising polytetrafluorethylene having a sliding surface; and
   a counterface in sliding contact with the sliding surface,
   wherein the counterface has a surface roughness which is not greater than 0.050 microns CLA and a hardness of not less than 1000 VPN.

2. A bearing as claim in claim 1, in which the surface roughness of the counterface is not greater than 0.02 microns CLA.

3. A bearing as claimed in claim 1, in which the hardness of the counterface is not less than 1100 VPN.

4. A bearing as claimed in claim 1, in which the counterface is the surface of a solid body comprising a material selected from the group of refractory and ceramic materials.

5. A bearing as claimed in claim 4, in which the said material is selected from the group comprising synthetic sapphire and synthetic diamond.

6. A bearing as claimed in claim 4, in which the said material is selected from the group comprising the carbides, nitrides, borides and oxides of silicon, tungsten, titanium, chromium and aluminium.

7. A bearing as claimed in claim 6, in which the said material comprises tungsten carbide in a cobalt matrix.

8. A bearing as claimed in claim 6, in which the said material comprises silicon nitride in a yttrium-/aluminium oxide/nitrogen vitreous matrix.

9. A bearing as claimed in claim 1, in which the counterface is the surface of a coating on a substrate, the coating comprising a material selected from the group of refractory and ceramic materials.

10. A bearing as claimed in claim 9, in which the substrate is metal.

11. A bearing as claimed in claim 9, in which the thickness of the coating is not less than 0.05 mm.

12. A bearing as claimed in claim 9, in which the said material is selected from the group comprising the carbides, nitrides, borides and oxides of silicon, tungsten, titanium, chromium and aluminium.

13. A bearing as claimed in claim 12, in which the said material comprises tungsten carbide in a cobalt matrix.

14. A bearing as claimed in claim 12, in which the said material comprises silicon nitride in a yttrium-/aluminium oxide/nitrogen vitreous matrix.

15. A bearing as claimed in claim 9, in which the said material is selected from the group comprising synthetic sapphire and synthetic diamond.

16. A bearing as claimed in claim 14 or claim 15, which is a spherical self-aligning bearing.

17. A bearing, for use in low stress, high frequency, small amplitude motions, the bearing comprising:
   (a) a reinforced low-friction plastics element comprising polytetrafluoroethylene having a sliding surface; and
   (b) a counterface in sliding contact with the sliding surface,
   (c) wherein the counterface has a surface roughness which is not greater than 0.050 microns CLA and a hardness of not less than 1000 VPN.

* * * * *

UNITED STATES PATENT AND TRADEMARK OFFICE
CERTIFICATE OF CORRECTION

PATENT NO. : 4,666,318
DATED : May 19, 1987
INVENTOR(S) : Michael B. Harrison

It is certified that error appears in the above-identified patent and that said Letters Patent is hereby corrected as shown below:

Column 4, line 43, "35" should read --$\pm$--.

Signed and Sealed this

Tenth Day of November, 1987

Attest:

DONALD J. QUIGG

Attesting Officer

Commissioner of Patents and Trademarks